United States Patent [19]

Danielsen

[11] Patent Number: 5,388,487
[45] Date of Patent: Feb. 14, 1995

[54] HYDRAULIC TOOL HOLDER WITH COOLANT JETS

[75] Inventor: Jan Danielsen, Orebro, Sweden

[73] Assignee: Sandvik AB, Sandviken, Sweden

[21] Appl. No.: 85,689

[22] Filed: Jul. 2, 1993

Related U.S. Application Data

[63] Continuation-in-part of Ser. No. 859,521, Jun. 11, 1992, abandoned.

[30] Foreign Application Priority Data

Oct. 17, 1990 [SE] Sweden .................................. 9003322

[51] Int. Cl.$^6$ ...................... B23B 27/10; B23B 31/10; B23B 27/08; B23B 31/30
[52] U.S. Cl. ............................................ 82/158; 82/152; 82/160; 279/2.08; 279/4.03; 407/11; 408/61; 409/136
[58] Field of Search .................. 82/152, 158, 160; 279/2.08, 4.03; 407/11; 408/61; 409/136

[56] References Cited

U.S. PATENT DOCUMENTS

| | | | |
|---|---|---|---|
| 3,250,542 | 5/1966 | Winnen et al. | 279/2.08 |
| 3,388,917 | 6/1968 | Winnen et al. | 82/169 |
| 4,213,354 | 7/1980 | Dahinden | 82/1.11 |
| 4,795,292 | 1/1989 | Dye | 407/11 |
| 4,955,264 | 9/1990 | Armbrust | 82/158 |

*Primary Examiner*—William E. Terrell
*Attorney, Agent, or Firm*—Dennison, Meserole, Pollack & Scheiner

[57] ABSTRACT

A hydraulic chuck for securing a lathe shaft and cutting tool to a tool holder is provided with spray nozzles to project cooling fluid on the cutting tool.

10 Claims, 4 Drawing Sheets

HYDRAULIC TOOL HOLDER WITH COOLANT JETS

This is a continuation-in-part of application Ser. No. 07/859,521, filed Jun. 11, 1992, now abandoned.

BACKGROUND OF THE INVENTION

The present invention relates to a tool holder. The holder is included in a processing machine and constitutes a holder for a machining tool such as a lathe shaft. The holder is secured in the machine by a tool attachment which may either be permanent or be located on a unit containing several tool holders in order to enable several machining operations to be carried out one after the other. Frequently the machining tool must be rather long so that machining can be performed in the hollow interior of a workpiece. With long machining tools there is a considerable risk of the tool being subjected to vibration, thus resulting in a poorer quality of machining. Several attempts have been made to reduce the occurrence of vibration. The tool shaft has, for instance, been arranged in a cradle with several screw joints pressing the shaft against the cradle. The vibration was not reduced as desired and wear occurred at the mouth of the holder, giving rise to further vibration. The problem of vibration is troublesome as is evident, for instance, from Sandvik Coromant's publication entitled "Turning with dampened lathe shafts" HV-5300:008-SWE.

One method of reducing the undesired vibrations in the case of long machining tools is to replace mechanical attachment means by a hydraulic retention arrangement. This is achieved by providing a tool holder with an aperture to receive the shaft of the machining tool. Inside the wall of the aperture is a tubular space which can be filled with a medium such as oil or fat. If this medium is subject to pressure the walls of the aperture will be forced inwards, thereby clamping the shaft of the machining tool extremely firmly. The force achieved in this way exceeds any force which can be achieved by mechanical means. Inner sleeves or bushings having the same outer diameter as the inner diameter of the aperture, but with different inner diameters can be inserted into the aperture, thereby enabling the tool holder to be used for machining tools of different thicknesses.

Reference is made to applicant's copending application Ser. No. 07/828,994 filed Feb. 4, 1992 for additional background information on hydraulic tool holders.

The use of hydraulic tool holders has created certain problems in connection with the application of cooling liquid to the metal cutting surfaces. The additional space occupied by the hydraulic mechanism in front of the fixed tool holder tends to obstruct the conventionally mounted nozzles which have been employed to supply cooling fluid. In addition, the longer cutting tools made practical by the hydraulic chuck require nozzles which must project the cooling liquid greater distances and with increased precision than heretofore.

SUMMARY OF THE INVENTION

The overall object of the present invention is to associate liquid cooling nozzles with hydraulic tool holders and chucks so as to achieve optimum liquid cooling at the machining surfaces.

It is a specific object of the invention to remove a portion of the flange of a hydraulic chuck to provide a suitable location for the liquid cooling nozzles.

It is another object of the invention to provide the inner surface of the flange of a hydraulic chuck with a pair of spaced concentric O-rings to form a coolant flow channel. Nozzles mounted on the outer surface of the flange are in fluid communication with the channel.

It is yet another object of the invention to provide the fixed tool holder with cooling liquid nozzles associated with an extended cutting shaft hydraulically mounted within the tool holder.

DESCRIPTION OF THE PREFERRED EMBODIMENTS

Figure 1:
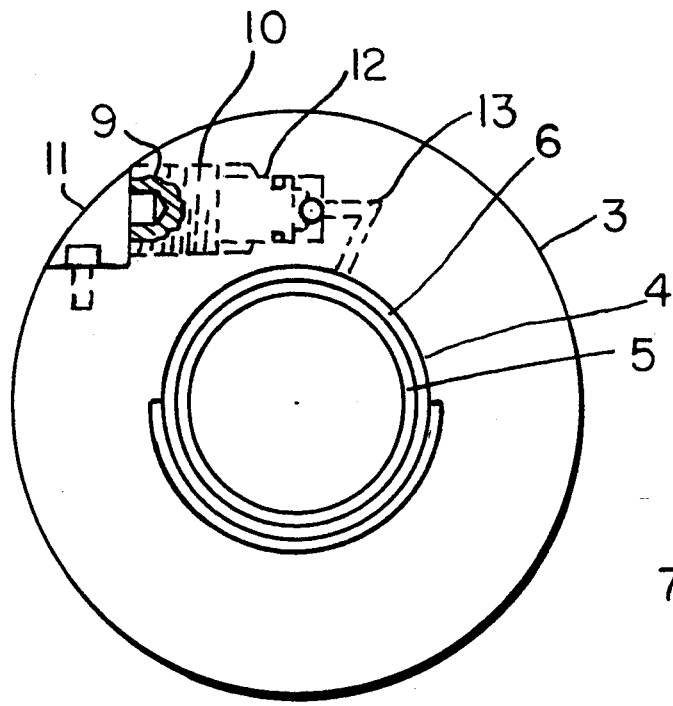
FIG. 1 is a part schematic end view of a bushing intended for insertion into the aperture of a tool holder.
Figure 2:
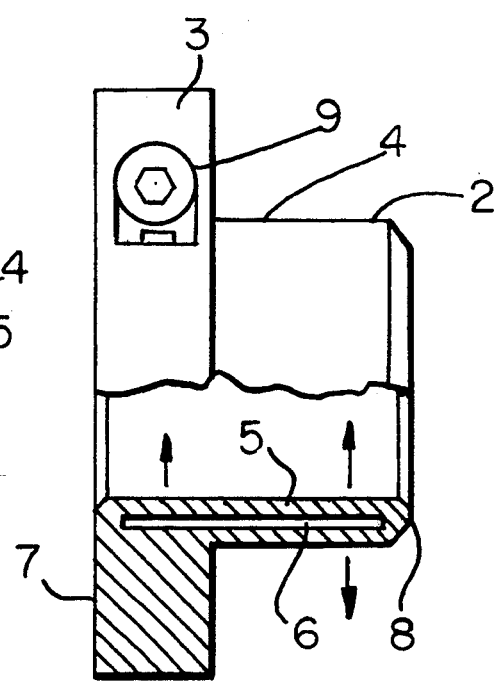
FIG. 2 is a side view of the bushing shown in FIG. 1.

Referring now in general to the drawings and in particular to FIGS. 1 and 2 which illustrate the basic bushing 1 shown in applicant's prior application Ser. No. 07/828,994, filed Feb. 4, 1992. Briefly, a hollow, thick-walled, stub shaft 2 supports an enlarged flange 3 at one end. The stub shaft 2 has a smooth machined outer surface 4 and inner surface 5. A cylindrical chamber 6 is provided between the outer and inner surfaces 4,5 of the stub shaft at a location spaced from the flange front face 7 and the stub shaft end 8. The cylindrical chamber 6 functions as an expansion chamber when it is pressurized with oil or grease. The wall thicknesses surrounding the chamber, the stress and strain properties of the metal, and the applied pressure are designed so as to create an outer expansion of the outer wall 4 and an inner contraction of inner wall 5 to an extent not exceeding the elastic limit of the metal used in the stub shaft.

Pressure is supplied to the expansion chamber 6 by means of a screw 9 operating in a threaded chamber 10 bored through outer flange surface 11. The screw may be designed to enter the flange outer surface 11 at an angle as shown in FIG. 1 or it may be tapped into the flange along a radius. The screw drives a piston 12 at its front end and when screwed into threaded chamber 10 compresses the oil or grease ahead of it. The threaded chamber 10 is connected to the expansion chamber 6 by means of fluid connection 13.

Figure 3:
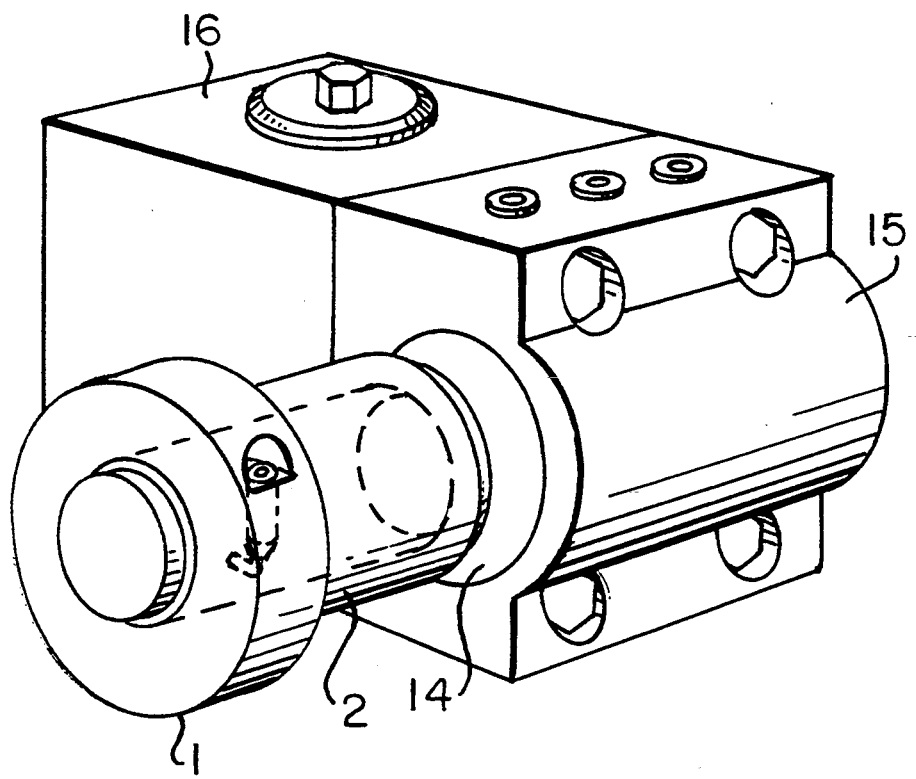
FIG. 3 is a perspective view showing the bushing being inserted into the tool holder.

FIG. 3 shows the bushing 1 in position for the stub shaft 2 to be inserted into a hole 14 in a tool holder 15. The clearance between the outer surface 4 of the stub shaft 2 and the hole 14 in the tool holder is selected to be a minimum consistent with easy insertion and removal of the bushing in the unpressurized condition. The tool holder 15 is secured to a tool attachment 16 which may either be permanently secured or may be mounted on a movable member provided with several machining tools.

Figure 4:
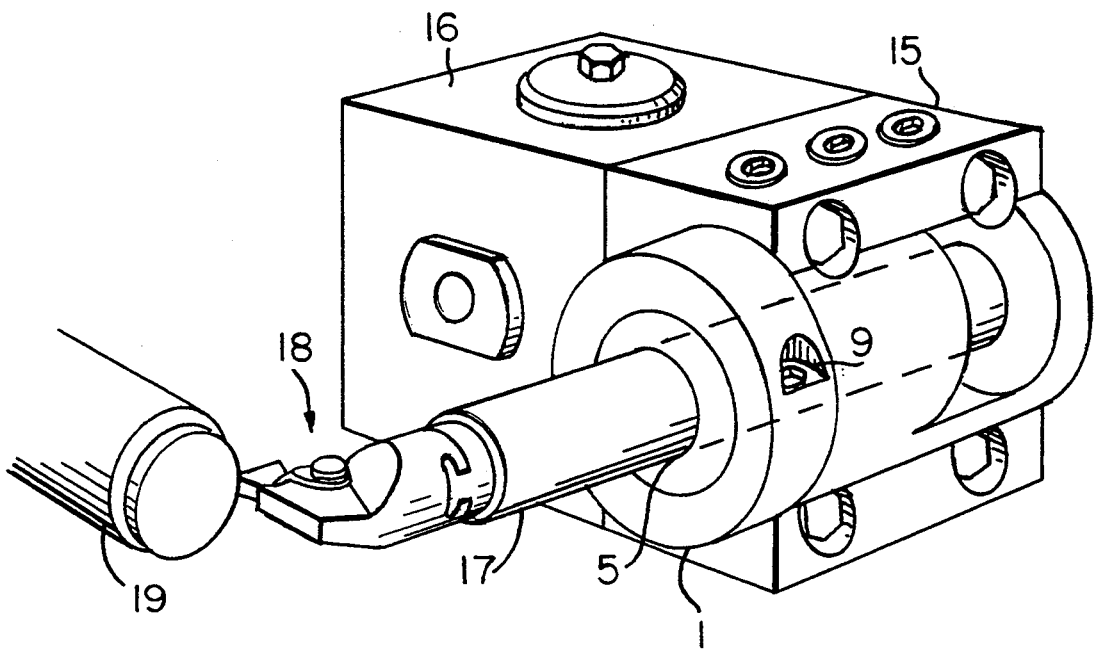
FIG. 4 is a perspective view of a tool holder and bushing supporting a cutting tool mounted on an extended shaft.

FIG. 4 shows the bushing 1 of FIG. 3 fully inserted within the hole 14 of the tool holder 15. A lathe shaft 17 is also inserted within the smooth inner surface 5 of the stub shaft. A cutting tool 18 is mounted on the end of the lathe shaft 17 for machining a workpiece 19.

In operation, with the bushing 1 and lathe shaft 17 in position, screw 9 is threaded into chamber 10 to drive piston 12 and increase the pressure in expansion chamber 6. Pressure in the range of 2000 bar can be developed which causes a clamping force to be exerted by the inner surface 5 of the stub shaft around the lathe shaft 17. At the same time the outer surface 4 of the stub shaft exerts a clamping force against the hole 14 in the tool holder. The clamping forces generated by expansion chamber 6 effectively form an hydraulic chuck which generates a clamping pressure greater than that produced by a mechanical chuck. To release the lathe shaft, the screw 9 is backed off.

During the cutting operation much heat is developed in the cutting tool and workpiece. A coolant fluid must be employed to extend the life of the cutting tool. The presence of the flange 3 in front of the tool holder created a tendency to obstruct the location of the conventionally employed spray nozzles. It is the purpose of this invention to integrate cooling nozzles with hydraulic chucks in a new and novel manner.

Figure 5:
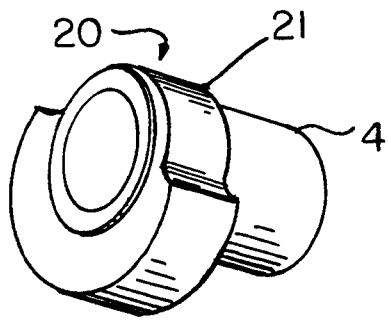
FIG. 5 is a perspective view of a modified bushing.
Figure 6:
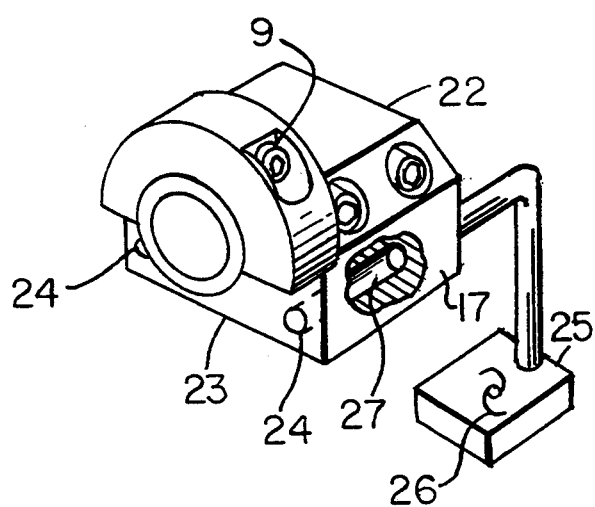
FIG. 6 is a perspective view of the modified bushing of FIG. 5 installed on a tool holder equipped with cooling nozzles.
Figure 7:
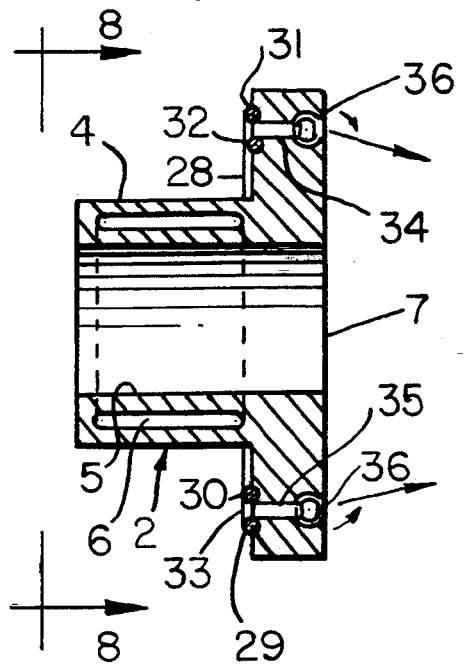
FIG. 7 is a side view of a modified bushing employed in a second embodiment of the invention.
Figure 8:
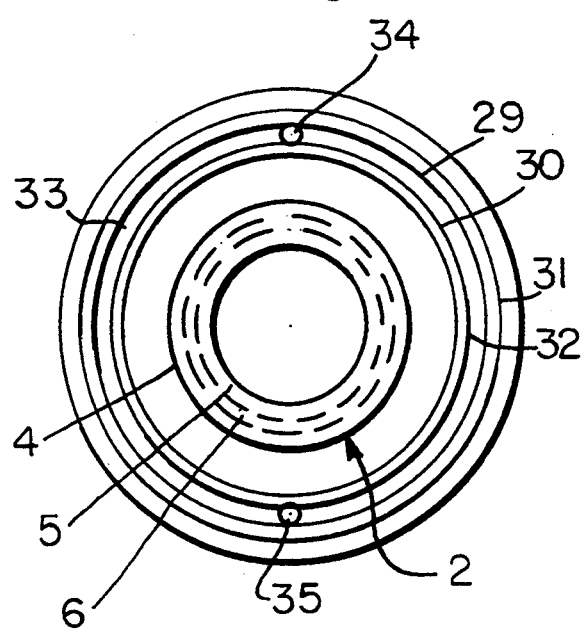
FIG. 8 is a view taken along lines 8—8 of FIG. 7.

A first embodiment of the invention is shown in FIGS. 5 and 6. The flange is formed in sector form with a cutaway portion 20 leaving an arcuate opening of up to 180 degrees. The cutaway portion is reenforced with a thickened layer of metal as at 21 to reenforce the arcuate sector surrounding the expansion chamber 6 which extends beyond the hole 14 in the tool holder.

The sector flange bushing of FIG. 5 is shown in FIG. 6 inserted in a tool holder 22. The flat front wall 23 of the tool holder supports a pair of spray nozzles 24 which lie in the area left free by the open arcuate portion of the flange. The nozzles 24 are connected to a source of coolant fluid 25 having an internally mounted pressure pump schematically shown at 26. Each nozzle is connected to a bored channel 27 in the base of the tool holder which is in fluid communication with the outlet of pump 26. While only one channel is shown in FIG. 6, the other nozzle is provided with a similar bored channel. Instead of two separate conduits, the nozzles can be fed in parallel by a single feed conduit.

FIGS. 7–10 show a second embodiment of the invention wherein the FIG. 4 hydraulic chuck and tool holder are modified to accommodate coolant spray nozzles. The rear end face 28 of the flange 3 is provided with two spaced concentric grooves 29,30 which receive two O-rings 31,32. The grooves 29,30 are deep enough to hold the O-rings in position but at the same time permitting the O-rings to extend beyond the surface of rear face 28.

The concentric space between the O-rings 31,32 defines a circular fluid channel 33 to be presently described. A pair of holes 34,35 are drilled through the flange 3 to be in fluid communication with the circular channel 33. A nozzle 36 is mounted on the front face 7 of the flange at the outlet of each hole 34,35.

Figure 9:
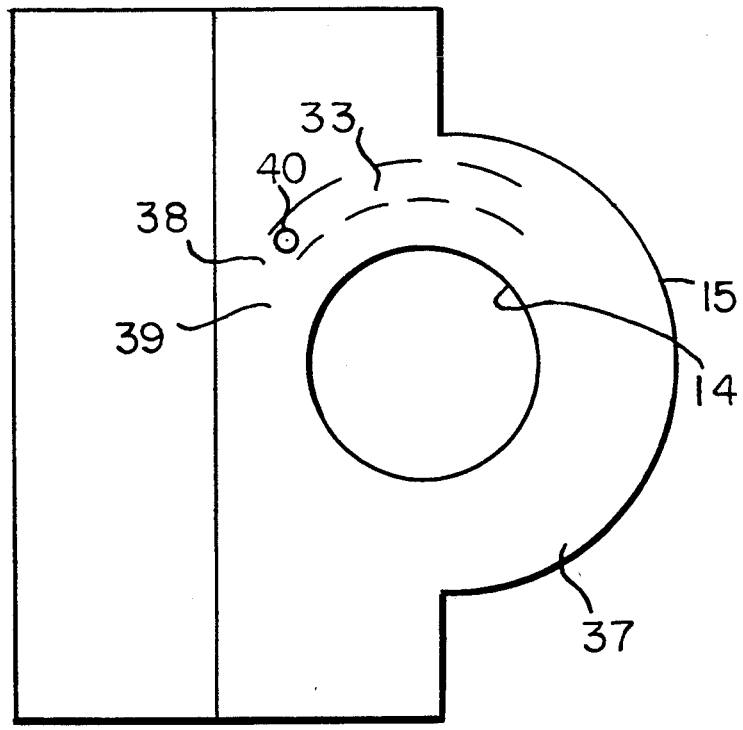
FIG. 9 is a front view of the tool holder of the second embodiment showing the location of a coolant feed port.

FIG. 9 is a front view of the tool holder showing the opening 14 which receives the stub shaft 2 and the flat surface 37 which mates with the rear face 28 of flange 3.

In assembly, when the stub shaft 2 is inserted in hole 14 of tool holder 15 and face 28 abuts surface 37, O-rings 31,32 are pressed against surface 37 forming the fluid tight circular channel 33. The circular sealing contact zones of the O-rings 31 and 32 are shown in dotted lines at 38 and 39 for explanatory purposes. A coolant feed bore 40 is drilled through tool holder 15 to feed fluid into channel 33.

Figure 10:
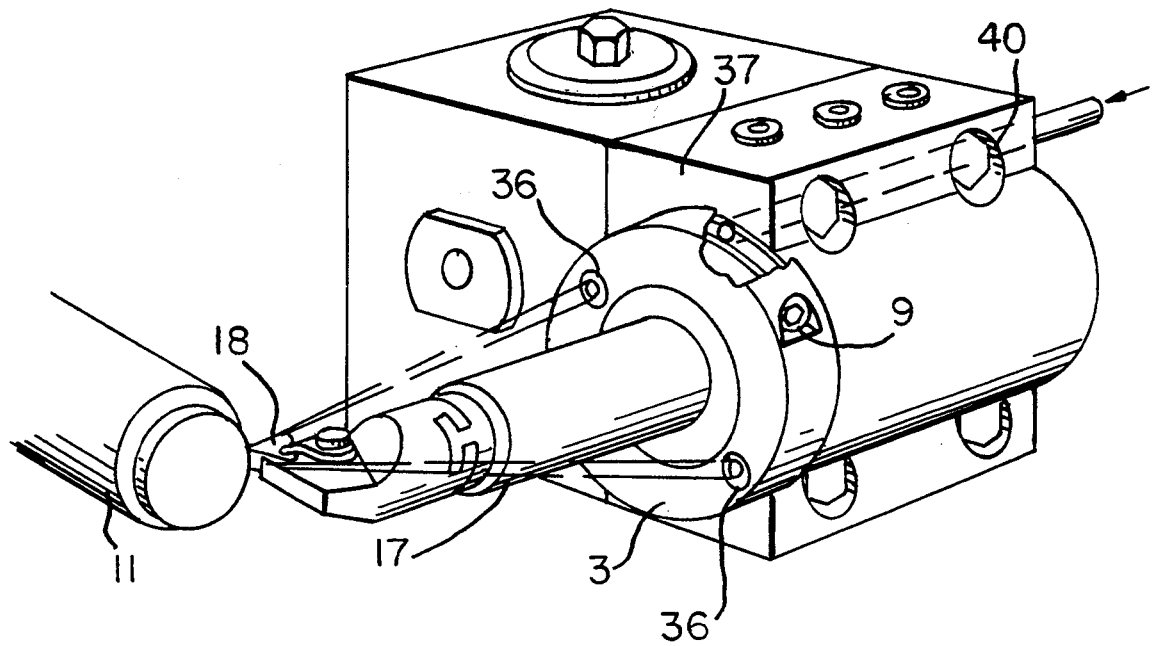
FIG. 10 is a perspective view of the second embodiment in assembled form.

As shown in FIG. 10, when lathe shaft 17 is inserted in the hydraulic chuck and the screw 9 rotated to pressurize the expansion chamber 6, the system is locked in place. Coolant fluid pumped into feed bore 40 will fill circular channel 33 and flow into holes 34 and 35 and exit from nozzles 36 as a spray directed to cutting tool 18.

Although the O-rings 31 and 32 are disclosed as being installed on the rear face 28 of the flange 3, it should be understood that the O-rings could be installed on flat surface 37 of the tool holder.

Figure 11:
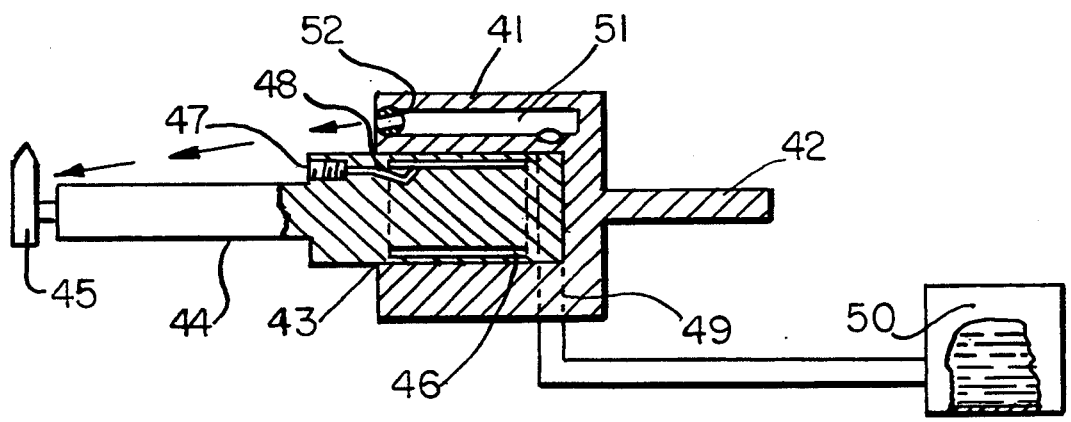
FIG. 11 is a third embodiment of the invention employing a modified tool holder supporting a cutting shaft with an integral bushing.

FIG. 11 shows a third embodiment of the invention employing a special tool holder and a combined lathe shaft and hydraulic chuck. A tool holder 41 having a supporting tailpiece 42 is provided with a central bore 43 which receives the end portion of a lathe shaft 44 which mounts a cutting tool 45 at one end and an expansion chamber 46 at the other end. The expansion chamber 46 is connected to a screw piston 47 by means of a conduit 48. The operation of screw piston 47 is similar to screw piston 9 described above.

In the FIG. 11 embodiment, the hydraulic chuck is made integral with the lathe shaft instead of having it as a separate component as in the first two embodiments of the invention. In operation, pressurization of expansion chamber 46 by operation of screw piston 47 causes the outer wall of expansion chamber 46 to expand slightly and grip the inner wall of central bore 43 in the tool holder.

Although the expansion chamber 46 in FIG. 11 is shown located in an enlarged portion of shaft 44 it should be understood that it can be integrated in a uniform diameter lathe shaft.

The tool holder 41 is provided with an internally isolated conduit 49 to convey coolant fluid from a source 50 to a plurality of coolant feed bores 51 having an adjustable discharge nozzle 52 mounted on a front face of the tool holder. While only one feed bore and nozzle is shown in FIG. 11, it should be understood that as many as needed may be provided.

It is not intended to limit the present invention to the details of illustration or terms of description of the preferred embodiments shown above. It will be appreciated by those skilled in the art that various modifications and alterations therein may be made within the scope of the present invention.

What is claimed is:

1. A metal working assembly comprising a tool holder having a smooth circular interior bore of fixed diameter, a lathe shaft having one end portion insertable in said interior bore and an opposite end supporting a metal working tool, hydraulically actuated expansion means acting between said lathe shaft end portion and said interior bore to clamp said lathe shaft to said tool holder, and wherein said hydraulically activated expansion means comprises a flanged bushing insertable into said circular bore of said tool holder, said flanged bushing having a coaxial bore, said lathe shaft insertable into said coaxial bore of said bushing; and an expandable chamber within said bushing acting when pressurized to clamp said bushing to said tool holder circular bore and to said lathe shaft, and further wherein said tool holder has a flat front surface, said flange of said flanged bushing abutting said flat front surface, said flange being in the form of an arcuate segment, said at least one nozzle being located on said flat front face of said tool holder in the area left open by said arcuate flange segment, at least one cooling fluid spray nozzle for spraying cooling fluid on said working tool; and a conduit provided internally of said tool holder forming part of the fluid flow path feeding said at least one nozzle.

2. The combination of claim 1 including two spaced nozzles located on said flat front face of said tool holder in the area left open by said arcuate flange segment.

3. The combination of claim 2 wherein said two spaced nozzles are in fluid communication with fluid conduits provided in the body of the tool holder.

4. The combination of claim 1 wherein said tool holder has a flat front surface, said flange of said flanged bushing being circular and having a front and rear face, said rear face abutting said flat front surface of said tool holder, said at least one nozzle being mounted on said circular flange front face.

5. The combination of claim 4 including at least two spaced nozzles mounted on said flange.

6. The combination of claim 5 including fluid coupling means coupling said nozzles on said flange to said internal conduit in said tool holder.

7. The combination of claim 6 wherein said fluid coupling means comprises a pair of spaced concentric grooves formed in said flange rear face, an O-ring seated in each groove with portions of said O-ring projecting above the flange rear face, said flange rear face abutting said tool holder front face whereby said O-rings form a fluid tight circular channel between said O-rings, each said nozzle being in fluid communication with said circular channel by means of a hole in said flange, and said conduit provided internally of said tool holder being in fluid communication with said circular channel.

8. The combination of claim 6 wherein said fluid coupling means comprises a pair of spaced concentric grooves formed in said tool holder front face, an O-ring sealed in each groove with portions of said O-rings projecting above the tool holder front face, said flange rear face abutting said tool holder front face whereby said O-rings form a fluid tight circular channel between said O-rings, each said nozzle being in fluid communication with said circular channel by means of a hole in said flange; and said conduit provided internally of said tool holder being in fluid communication with said circular channel.

9. The combination of claim 1 wherein said at least one cooling fluid spray nozzle is mounted on said tool holder.

10. The combination of claim 9 wherein said hydraulically actuated expansion means comprises an expansion chamber formed in said lathe shaft one end portion, said expansion chamber when pressurized acting to clamp said lathe shaft to said interior bore of said tool holder.

* * * * *